No. 636,670. Patented Nov. 7, 1899.
D. E. JONES.
PNEUMATIC COTTON HANDLING APPARATUS.
(Application filed Feb. 2, 1899.)
(No Model.)
Fig. 1.
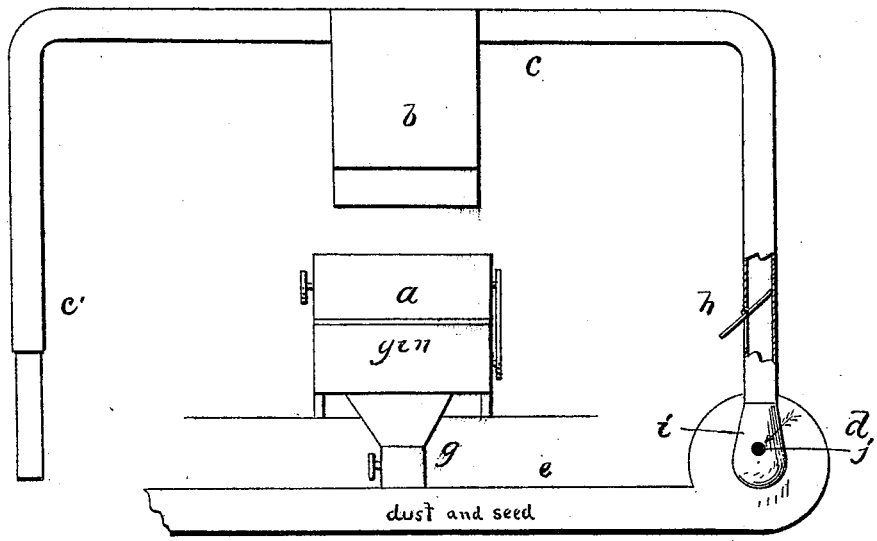
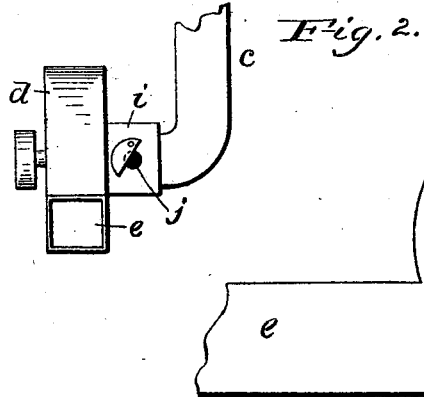
Fig. 2.
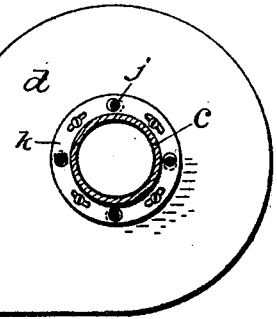
Fig. 3.
Witnesses
G. M. Lamasure
G. H. Walmsley
Inventor
Dudley E. Jones
By Daniel Davis
Attorneys
THE NORRIS PETERS CO., PHOTO-LITHO., WASHINGTON, D. C.

UNITED STATES PATENT OFFICE.

DUDLEY E. JONES, OF LITTLE ROCK, ARKANSAS.

PNEUMATIC COTTON-HANDLING APPARATUS.

SPECIFICATION forming part of Letters Patent No. 636,670, dated November 7, 1899.

Application filed February 2, 1899. Serial No. 704,279. (No model.)

*To all whom it may concern:*

Be it known that I, DUDLEY E. JONES, a citizen of the United States, residing at Little Rock, in the county of Pulaski and State of Arkansas, have invented certain new and useful Improvements in Pneumatic Cotton-Handling Apparatus, of which the following is a specification, reference being had therein to the accompanying drawings, in which—

Figure 1 represents a diagram of one form of an apparatus embodying my invention, and Figs. 2 and 3 detail views showing slight modifications.

This invention has reference to that well-known class of apparatus for handling seed-cotton pneumatically in which means are provided for taking the seed-cotton from a vehicle or other receptacle located outside of the gin-house or from a distant part of the gin-house and transporting and automatically delivering it to the gins therein, the dust and foreign matter being usually screened from the cotton and driven out of the gin-house and means being also provided for depositing the cotton-seed into the dust-flue beyond the fan, so that the same will be driven out with the dust to a suitable house or room adjacent the gin-house.

The special object of the present invention is to provide simple means whereby cotton-seed may be driven to a much greater distance than has heretofore been possible except by the use of an additional fan; and to this end the invention consists, broadly stated, of a main conduit and means for receiving and delivering the cotton therefrom to the gin, a fan or blower having its intake-opening of greater area than said conduit and connected thereto, means for supplying a supplemental current of air to the intake-opening during the movement of cotton through the main conduit, a dust-flue leading from the fan to a suitable point of deposit, and means for introducing seed into said flue, as more fully hereinafter set forth.

In the drawings, $a$ represents a gin; $b$, the cotton-receiving box, provided with suitable devices to deliver the cotton into the gin; $c$, a main conduit for conveying the cotton to the box $b$, one end $c'$ being extended to the exterior of the gin-house in the usual manner and the other end being connected to the intake-opening of a fan $d$; $e$, the dust-flue, extending from the fan to a suitable point of deposit, and $g$ a device adapted to receive the cotton-seed from the gin and deliver it into the dust-flue at a point near the fan. The foregoing devices are in common use and a full description of their operation is not necessary, it being understood that the fan sucks up the cotton and delivers it to the gin through box $b$ and blows the dust out through the conduit $e$, a suitable valve being provided at $h$ at a point between the fan and the cotton-box $b$ to relieve the vacuum created by the fan whenever it is desired to permit the cotton accumulated in the box $b$ to fall into the gin.

By the arrangement described—namely, where the fan that elevates the cotton is employed to blow the seed—it has heretofore been impossible to blow the seed to a very great distance, thereby necessitating an additional fan or the adoption of other means for conveying it where the seed-house or other receptacle is located at too great a distance from the gin-house to enable the dust-flue to be utilized as a conveyer. As a partial remedy in some instances larger fans have been employed than was necessary to simply elevate the cotton, it being not uncommon to employ a fan with a thirteen-inch intake-opening connected to a nine-inch conduit; but this expedient has proven of little value, as the power to drive the seed has been increased but little thereby.

My invention consists in the discovery that where an enlarged fan is used the reason of the failure is that the fan rotates in a partial vacuum (sufficient air not being obtainable through the cotton-conduit to enable its full power to be utilized) and the provision of means whereby a supplemental or auxiliary current of air is supplied to the fan during the movement of the cotton through the main conduit, preferably near the fan-casing, this current supplying the fan with the air necessary to permit it to exert its full power, thereby enabling the seed and dust to be blown at great speed practically to any desired distance.

In the drawings the main conduit is enlarged at $i$ to connect up the main portion of the conduit to the intake-opening of the fan, said enlarged part terminating short of the cut-off $h$ and being provided with an opening $j$, this opening being open at all times irrespective of the position of the cut-off valve h. This opening is of an area less than the difference between the area of the main cotton-conduit c and the area of the intake-opening of the fan, its size being determined not only by said difference in area, but also by the distance the seed is to be blown, &c. It will therefore be observed that the essential feature of the invention lies in employing a fan having an intake-opening larger than the main conduit and in supplying a continuous current of air to the intake-opening at a suitable point between the fan and the means for receiving and delivering the cotton to the gin, whereby the fan will be supplied its full or nearly its full complement of air and will exert its full power. Where a cut-off or valve, as at h, is employed, as is the case in many elevators, the supplemental current will enter at a point between said cut-off and the fan, although I see no reason why the supplemental current cannot be introduced at a point beyond the valve or cut-off if the enlargement of the conduit be carried beyond said valve or cut-off.

It will be understood that my invention is applicable to all styles of cotton-elevators, and it will also be understood that I do not wish to confine myself to any particular form of enlargement i, it being shown tapering in Fig. 1 and rectangular in Fig. 2. It will also be understood that a suitable valve or valves may be applied to the opening or openings j to regulate the area of the same or to close the openings entirely, as the exigencies of the case may require; nor am I limited as to the area of the opening or openings j, although I have found in practice that such area should never exceed the difference in area between the diameter of the cotton-conduit and the intake-opening of the fan. Furthermore, it will be observed that even the enlargement of the conduit may be done away with and the openings j be made in the fan-casing close to the point where the main conduit connects to the same or in a flat reducing-collar fitted around the intake-opening and centering the main conduit in the intake-opening, as shown in Fig. 3, these openings being regulated by means of a suitable ring slide or valve k, adjustably attached to the reducing-collar or to the fan-casing. It is possible also that the supplemental volume of air may be introduced into the fan-casing at a point other than the usual central intake-opening at one side of the fan-casing. Therefore wherever I use the term "intake-opening" I desire it understood that it comprehends any opening in the conduit or fan-casing through which air is drawn by the fan.

In practical tests I have discovered that by my invention the seed can be blown with great force to at least double the distance that was possible with apparatus using simply an enlarged fan.

Having thus fully described my invention, what I claim, and desire to secure by Letters Patent, is—

1. In an apparatus of the class described, the combination of a main conduit and means for receiving and delivering the cotton to the gin, a fan or blower having its intake-opening of greater area than the conduit and connected thereto, means for supplying a supplemental current of air to the intake-opening during the movement of cotton through the main conduit, a dust-flue leading from the fan to a suitable point of deposit, and means for introducing seed into this dust-flue.

2. In an apparatus of the class described, the combination of a main conduit and means for receiving and delivering the cotton to the gin, a fan or blower having its intake-opening of greater area than the conduit and connected thereto, means for supplying a supplemental current of air to the intake-opening during the movement of cotton through the main conduit, means for varying the area of the supplemental current of air, a dust-flue leading from the fan to a suitable point of deposit, and means for introducing seed into this dust-flue.

3. In an apparatus of the class described, the combination of a main cotton-conduit and means for receiving and delivering the elevated cotton, a blower having its enlarged intake-opening connected to said conduit, a cut-off or valve in the conduit between the fan and the receiving means, the conduit being enlarged where it connects to the intake-opening of the fan, an opening being formed in this enlarged portion to supply the fan with a supplemental current of air during the movement of the cotton, a seed-driving flue connected to the fan and means for introducing cotton-seed into this flue.

4. In an apparatus of the class described, the combination of a main conduit, and means for delivering the cotton therefrom, a fan for drawing the cotton through said conduit to the point of delivery, said fan being of larger capacity than said conduit at its intake end, means for supplying a supplemental volume of air to the fan during the movement of the cotton, a dust-flue leading from the fan, whereby more air is forced through the dust-flue than is drawn in with the cotton and through the cotton-conduit, and means for delivering cotton-seed into said dust-flue.

In testimony whereof I hereunto affix my signature, in the presence of two witnesses, this 27th day of January, 1899.

DUDLEY E. JONES.

Witnesses:
P. V. OLSSON,
ARTHUR C. JONES.